US007676472B2

(12) United States Patent
Kurhekar et al.

(10) Patent No.: US 7,676,472 B2
(45) Date of Patent: Mar. 9, 2010

(54) METHOD AND APPARATUS FOR ACCESSING WEB SERVICES

(75) Inventors: Manish P Kurhekar, Nagpur (IN); Biplav Srivastava, Noida (IN)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 10/862,221

(22) Filed: Jun. 7, 2004

(65) Prior Publication Data

US 2006/0004764 A1   Jan. 5, 2006

(51) Int. Cl.
*G06F 17/30* (2006.01)
(52) U.S. Cl. .................................. 707/10
(58) Field of Classification Search .................. None
See application file for complete search history.

(56) References Cited

U.S. PATENT DOCUMENTS

| 7,016,892 | B1* | 3/2006 | Kokkonen et al. | 707/3 |
| 2004/0064428 | A1* | 4/2004 | Larkin et al. | 707/1 |
| 2005/0060295 | A1* | 3/2005 | Gould et al. | 707/3 |
| 2005/0091184 | A1* | 4/2005 | Seshadri et al. | 707/1 |
| 2005/0240558 | A1* | 10/2005 | Gil et al. | 707/1 |

OTHER PUBLICATIONS

Michael Stal, Web Services: Beyond Component-Based Computing, Oct. 2002, Communications of the ACM, vol. 45, No. 10, pp. 71-76.*
Bellwood, UDDI Version 2.04 API Specification, UDDI Committee Specification, Jul. 19, 2002 (http://uddi.org/pubs/ProgrammersAPI_v2.htm).*
UDDI Version 2.04 API Specification, UDDI Committee Specification, Jul. 19, 2002.*
Stal, "Web Services: Beyond Component-Based Computer", Communications of the ACM, Oct. 2002, vol. 45, No. 10.*
"*Universal Description, Discovery and Integration of Web Services*", downloaded from URL http://uddi.org on Jan. 7, 2004.
"*The Evolution of UDDI*", UDDI.org White Paper, The Stencil Group, Inc., Jul. 19, 2002, downloaded from URL http://uddi.org on Jan. 7, 2004.
"*Welcome to WSIF:Web Services Invocation Framework*", downloaded from URL http://ws.apache.org/wsif/ on Jan. 7, 2004.
"*Overview*", downloaded from URL http://ws.apache.org/wsif/overview.html on Jan. 7, 2004.
Dubinko M., "XForms and Microsoft InfoPath", downloaded from URL http://www.xml.com/pub/a/2003/10/29/infopath.html on Aug. 31, 2004.

(Continued)

*Primary Examiner*—John R. Cottingham
*Assistant Examiner*—Nirav K Khakhar
(74) *Attorney, Agent, or Firm*—Gibb I.P. Law Firm, LLC (57) ABSTRACT

Methods, apparatuses and computer programs for making information relating to web services available to applications hosted by a client platform and/or using such information to invoke web services for use by an application hosted by a client platform are disclosed. The information is preferably obtained from a local repository or otherwise from a remote repository via the internet. The information may relate to web services previously used by the applications such as particular invocation instances of those web services. The information may comprise statistical Quality of Service (QoS) information relating to particular invocation instances of web services.

12 Claims, 10 Drawing Sheets

OTHER PUBLICATIONS

"*MSDN Technical Articles*", downloaded from URL http://msdn.microsoft.com/office/understanding/infopath/techarticles/ on Sep. 15, 2004.

"*InfoPath 2003 Product Overview*", Mar. 10, 2003, Microsoft Corporation, downloaded from URL http://www.microsoft.com/office/infopath/prodinfo/overview.mspx?pf=true on Aug. 31, 2004.

Hoffman M., Microsoft Corporation, "*Architecture of Microsoft Office InfoPath 2003*", downloaded from URL http://msdn.microsoft.com/office/understanding/infopath/techarticles/default.aspx?pull=/library/en-us/odc_ip2003_ta/html/odc.inarch.asp on Aug. 31, 2004.

\* cited by examiner

METHOD AND APPARATUS FOR ACCESSING WEB SERVICES

FIELD OF THE INVENTION

The present invention relates to access of web services by software applications and more particularly to management of information relating to web services.

BACKGROUND

Web services are reusable software components that may be accessed by applications over a network for the delegation of sub-functionality. Web services are made available for online access by deployment of those web services on a server that is compatible with the web service specification. The specification of a web service typically comprises a description and interface and invocation (binding) information, which is published in a web services directory. Applications can thus search for web services of interest from a web services directory, select web service interfaces that match specific criteria, and invoke web services using published binding and connectivity information.

Web services are typically described using the Web Services Definition Language (WSDL) specification, which is an XML-based language for defining messages that provide an abstract definition of data being transmitted and operations provided by a web service to transmit the messages. Four types of communication are defined that relate to a service's operation (endpoint): the endpoint receives a message (one-way), the endpoint sends a message (notification), the endpoint receives a message and sends a correlated message (request-response), and the endpoint sends a message and receives a correlated message (solicit-response).

Operations are grouped into port types, which describe abstract end points of a web service such as a logical address under which an operation can be invoked. A WSDL message element defines the data elements of an operation. XML Schema syntax is used to define platform-independent data types which messages can use. Each message can consist of one or more parts. The parts may be compared to the parameters of a function call in a traditional programming language. Concrete protocol bindings and physical address port specifications complete a web service specification.

Figure 1:
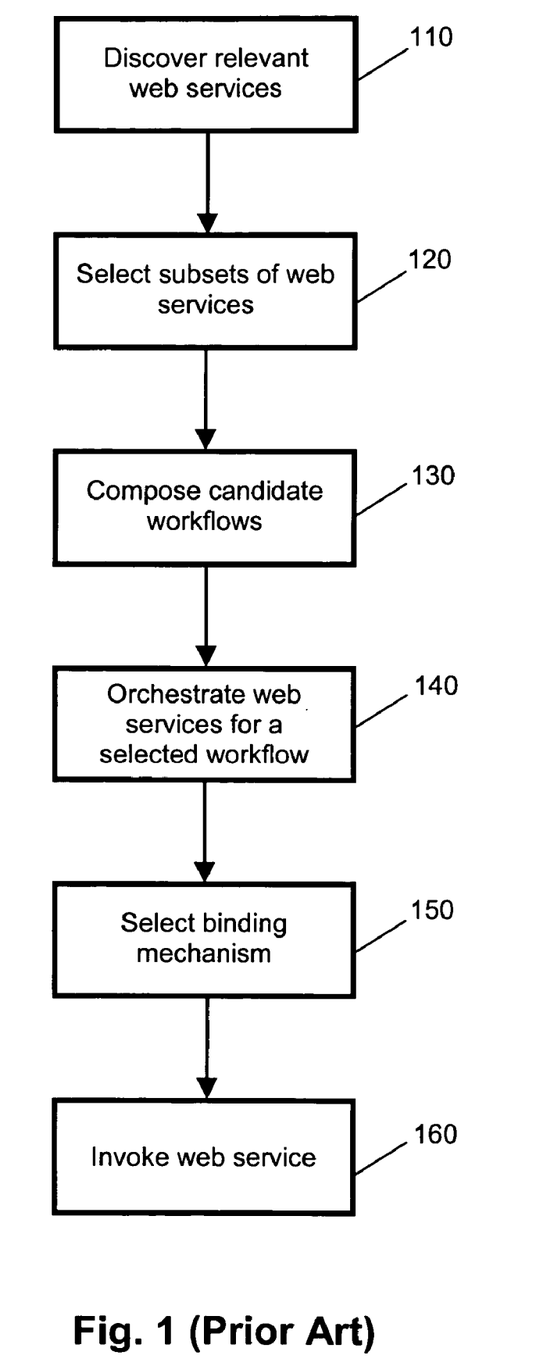
FIG. 1 is a flow diagram of a conventional method for accessing web services.

FIG. 1 shows a method for accessing web services. At step 110, one or more web services relevant to a required functionality are discovered by an application. Discovery is typically performed by searching a web services directory. One or more subsets of the web services that are discovered in step 110 are selected based on certain selection criteria, at step 120. While each subset of web services selected is potentially able to service the required functionality, the exact detail (e.g., workflow) is unknown at this stage. Candidate workflows are composed or generated from the web services selected in step 120, at step 130. The candidate workflows specify the data and control flows between the web services in each subset of web services. At step 140, the web services for the most promising workflow are orchestrated. Orchestration requires selection of web service instances to be used in the most promising workflow. A web service instance comprises a specific instance of a more generic web service. For example, "AmazonBookPurchaseService" and "Barnes&NobleBookPurchaseService" are instances of the generic web service "OnlineBookPurchaseService". Control and data flows may be rearranged and optimized based on the physical details of the workflow. At step 150, a binding mechanism is selected for access by an application. The binding mechanism is typically selected from various programmatic mechanisms such as Simple Object Access Protocol (SOAP), Simple Mail Transfer Protocol (SMTP), local Java access, etc. SOAP is a XML-based protocol for the exchange of information in a distributed environment. The web service/s is/are invoked with input parameters, if any, at step 160.

Applications may combine some of the stages (e.g., discovery, selection and composition) and/or hardcode certain actions.

The Web Services Invocation Framework (WSIF) provides a mechanism for invoking web services without committing to physical details/binding relating to where such web services are located. Rather, binding is resolved at execution time based on user-specifiable criteria. While providing a means for abstracting a single invocation of a web service, the WSIF does not provide a mechanism for reusing information for multiple invocations of a web service from an application or for invocation of a web service by multiple applications running on a client platform.

The Universal, Description, Discovery and Integration (UDDI) directory provides a mechanism to search for web services on a remote web service registry. However, the UDDI directory does not provide a mechanism for reusing information for multiple invocations of a web service from a single application or for invocation of a web service by multiple applications running on a client platform.

Applications typically manage information relating to web services individually. However, duplication and redundancy of information and software program code for housekeeping and information processing to select and invoke web services results when information common to multiple web services is required by an application and/or when multiple applications running on the same client platform use the same web services. As information relating to web services access may change frequently, the foregoing may result in poor maintainability of applications.

A need thus exists for management of information relating to web services used by one or more applications running on a client platform.

SUMMARY

An aspect of the present invention provides a method for making information relating to web services available to applications hosted by a client platform. The information relating to web services is obtained from a remote repository via the internet and at least a portion of the information is stored in a local repository hosted by the client platform for access by applications.

Another aspect of the present invention provides a method for invoking a web service for use by an application hosted on a client platform. Information relating to the web service is obtained from a local repository hosted by the client platform and the web service is invoked using the information.

If unavailable from the local repository, the information may optionally be obtained from a remote repository. At least a portion of the information may then be stored in the local repository.

The information may relate to web services previously used by the applications such as particular invocation instances of those web services. The information may comprise statistical Quality of Service (QoS) information relating to particular invocation instances of web services.

Other aspects of the present invention provide apparatuses and computer programs for performing the methods described above.

BRIEF DESCRIPTION OF THE DRAWINGS

Embodiments are described hereinafter, by way of example only, with reference to the accompanying drawings in which.

DETAILED DESCRIPTION

Methods, apparatuses and computer programs are described herein for managing information relating to web services for access of those web services by applications running on a client platform. Examples of client platforms include, but are not limited to, operating systems, computer systems, and computer networks such as local area networks (LANs), wide area networks (WANs) and wireless networks.

Figure 2:
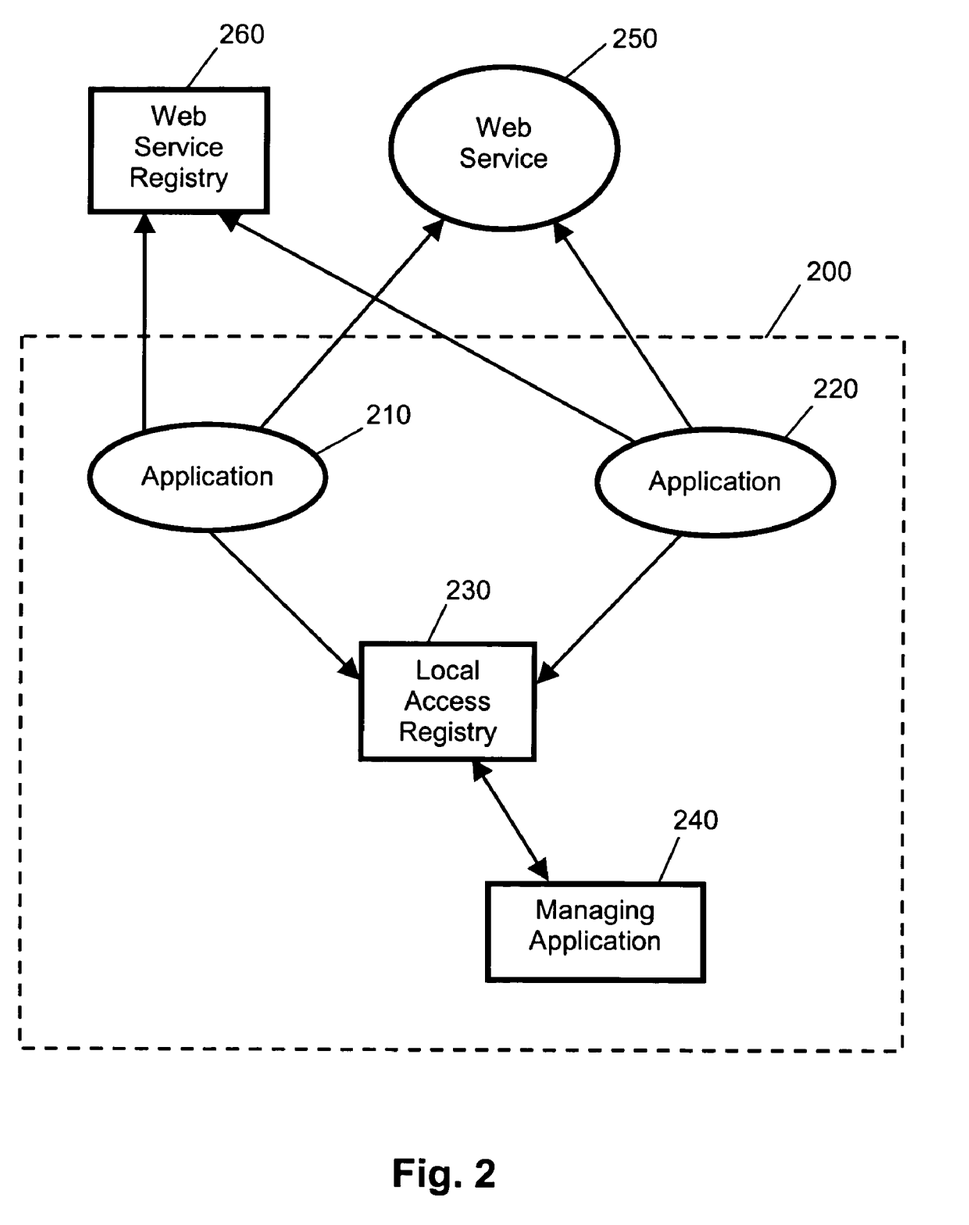
FIG. 2 is a block diagram of a system for accessing a web service from an application hosted by a client platform.

FIG. 2 shows a system for accessing a web service from an application hosted by a client platform. Software program applications 210 and 220 and a local access registry 230 are hosted by a client platform 200. A web service 250 and a web service registry 260 are located remotely from the client platform 200 and are both accessible by the applications 210 and 220 via the internet (not shown).

The local access registry 230 comprises a local repository for storing reusable access information for known web services. The repository may take the form of, a database, a data registry such as those used by Lightweight Directory Access Protocol (LDAP) or Java Naming and Directory Interface (JNDI), or a local service/application. Data and/or entries in the local access registry 230 may be updated manually (i.e., by a user) or automatically by way of a managing application 240, which is typically but not necessarily hosted by the client platform 200. Automatic updating may be performed periodically or in response to particular events. Typical information that may be stored in the local access registry 230 includes, but is not limited to:

Discovery related information:
UDDI directory information, goal criteria, and resulting subsets of web services.
Selection related information:
Selection criteria and selected subsets of web services.
Composition related information:
Composed candidate workflows and corresponding rankings.
Orchestration related information:
Orchestration selections and corresponding rankings, actual workflows, Quality of Service (QoS) or Service Level Agreement (SLA) requirements, and runtime context/statistical information.
Binding related information:
Web Services Description Language (WSDL) information, binding options and decision criteria, and context/statistical information.
Invocation related information:
Proxy/network connectivity, parameter level, and statistical/context information.

Figure 3:
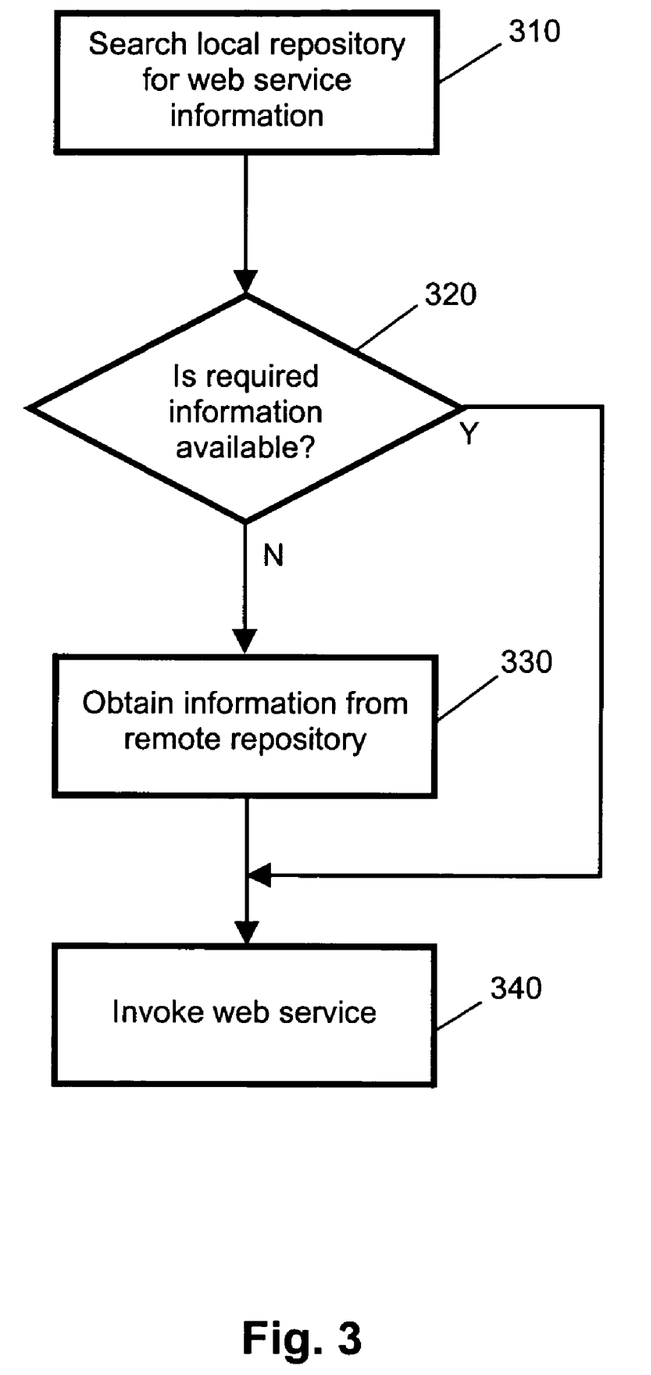
FIG. 3 is a flow diagram of a method for accessing a web service from an application hosted by a client platform.

FIG. 3 shows a method for accessing a web service from an application hosted by a client platform.

At step 310, a local repository is searched by an application program for information relating to one or more web services for providing a required functionality. A determination is made at step 320 whether information relating to one or more suitable web service/s is available from the local repository. Availability of the information may result from previous identification or invocation of web service/s to provide the same or a similar required functionality by the same application or by another application hosted by the same client platform. If the information is available (Y), the application uses the information to invoke the appropriate web service/s at step 340. If the information is unavailable or stale (N), the requesting application obtains the information from a remote repository via the internet at step 330. Step 330 may comprise the method shown in FIG. 1, whereby the requesting application accesses a web service registry such as a UDDI directory via the internet (not shown) to obtain information relating to web services for a required functionality. Thereafter, the application program may invoke the web service/s at step 340.

Various mechanisms may be used to determine whether the information is stale. Examples of such mechanisms include, but are not limited to, policies based on time and/or other events (e.g., 2 weeks have passed since the information was last updated) and sniffer programs that periodically contact the information source to determine whether any discrepancy between the local and remote instances exist.

Figure 4:
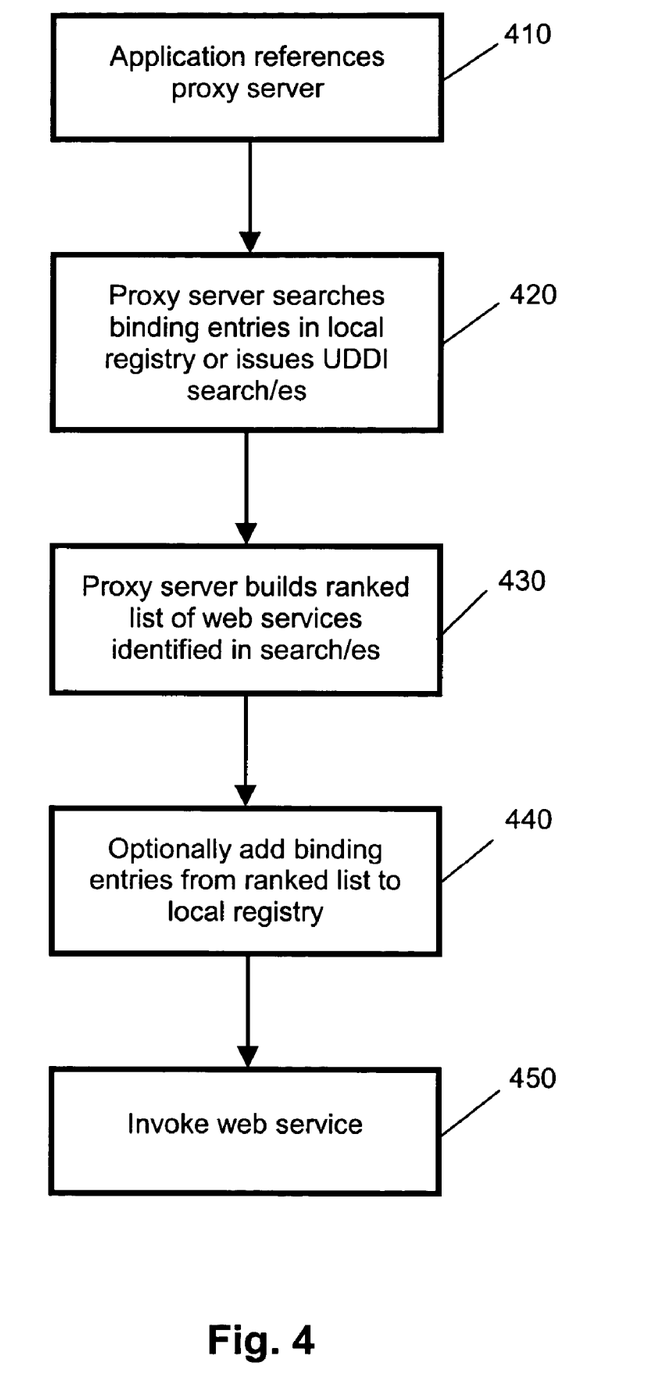
FIG. 4 is a flow diagram of another embodiment of the method of FIG. 3.

FIG. 4 shows another embodiment of the method of FIG. 3. At step 410, a requesting application references a local proxy server on a fixed port prior to invoking a web service. At step 420, the proxy server searches binding entries in a local registry or issues UDDI search/es. A subset of given inputs (search criteria) may be used to identify a superset of web services. Alternatively, a superset of given inputs may be used to identify specialised web services. The proxy server uses the search results to build a ranked list of web services identified in step 420, at step 430. Binding entries relating to one or more items on the ranked list may be added to the local registry at step 440, if appropriate. The web service is invoked at step 450.

In alternative embodiments, the local registry can be queried at runtime of an application or while designing a new application.

Bindings may be stored by Java Naming and Directory Interfaces (JNDI), which enable distributed components of an application to locate one another, Lightweight Directory Access Protocol (LDAP) or in predetermined files (as per step 230 of FIG. 2). Programmatic access thereto is enabled by published Application Programmer Interfaces (API's). A Graphical User Interface (GUI) may be used to manage registry entries and/or rules to manage the lifetime of registry entries.

Figure 5:
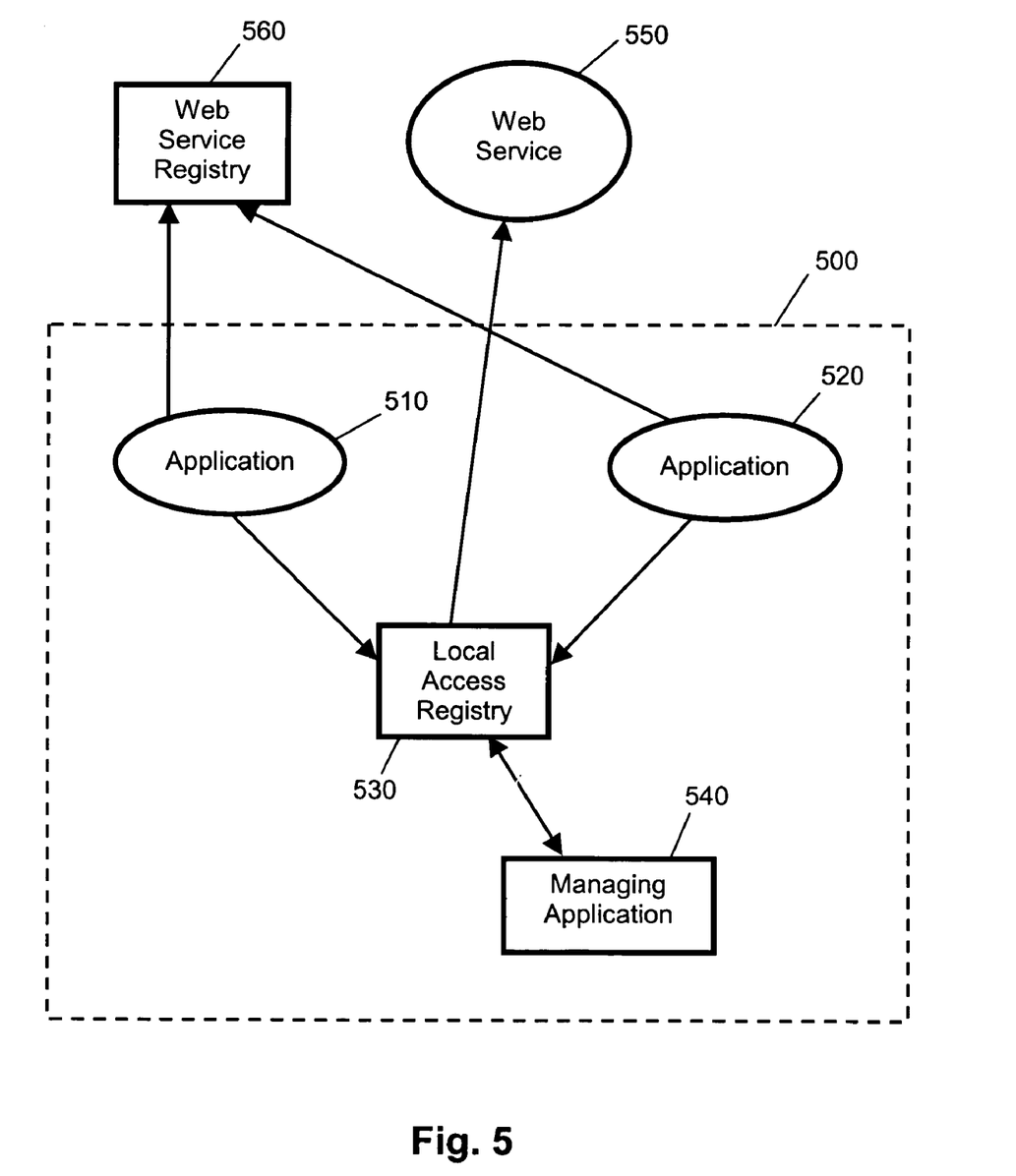
FIG. 5 is a block diagram of another system for accessing a web service from an application hosted by a client platform.

FIG. 5 shows another embodiment of a system for accessing a web service from an application hosted by a client platform. Software program applications 510 and 520 and a local access registry 530 are hosted by a client platform 500. A web service 550 and a web service registry 560 are located remotely from the client platform 500. The web service registry 560 is accessible via the internet (not shown) by the applications 510 and 520 whereas the web service 550 is accessible via the internet (not shown) by the local access registry 530. In other respects, the system of FIG. 5 is substantially identical to the system of FIG. 2.

Figure 6:
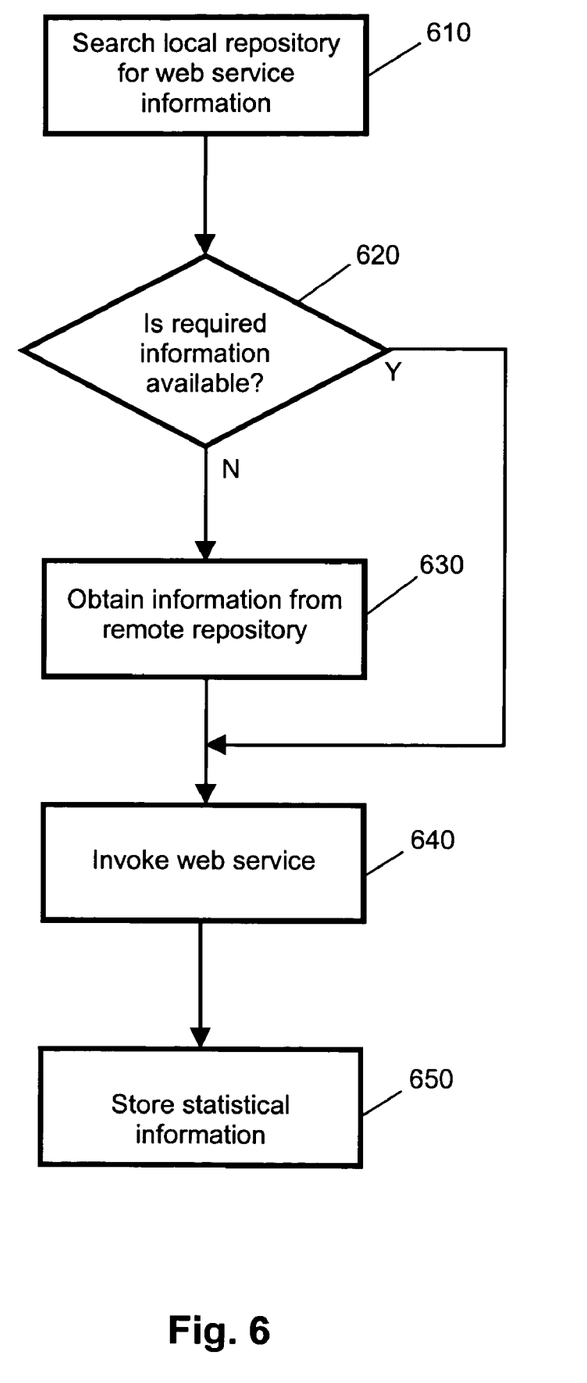
FIG. 6 is a flow diagram of a another method for accessing a web service from an application hosted by a client platform.

FIG. 6 shows another method for accessing a web service from an application hosted by a client platform. At step 610, a local repository is searched by an application for information relating to one or more web services to provide a required functionality. A determination is made at step 620 whether suitable information is available from the local repository. Availability of the information may result from previous identification or invocation of web service/s to provide the same required functionality. If the information is available (Y), the local repository proceeds to invoke the appropriate web service/s at step 640. If the information is unavailable or stale (N), the requesting application obtains the information from a remote repository via the internet at step 630. Step 630 may comprise the method shown in FIG. 1, whereby the requesting application accesses a web service registry such as a UDDI directory via the internet (not shown) to obtain information relating to web services for a required functionality. Thereafter, the web service/s are invoked by the local repository at step 640. As the local repository not only stores common access information, but also invokes the web services, the local repository stores statistical information relating to invocation and web service instances at step 650.

Web services are typically deployed at locations for which information (e.g., WSDL content relating to binding such as a URL and protocol) is present in the local registry or remote repository. Once a client application has retrieved this information, the application may use networking libraries (e.g., open sockets) to invoke a web service directly or with the help of a proxy server. In the absence of any security related access restriction, direct invocation is possible.

Figure 7:
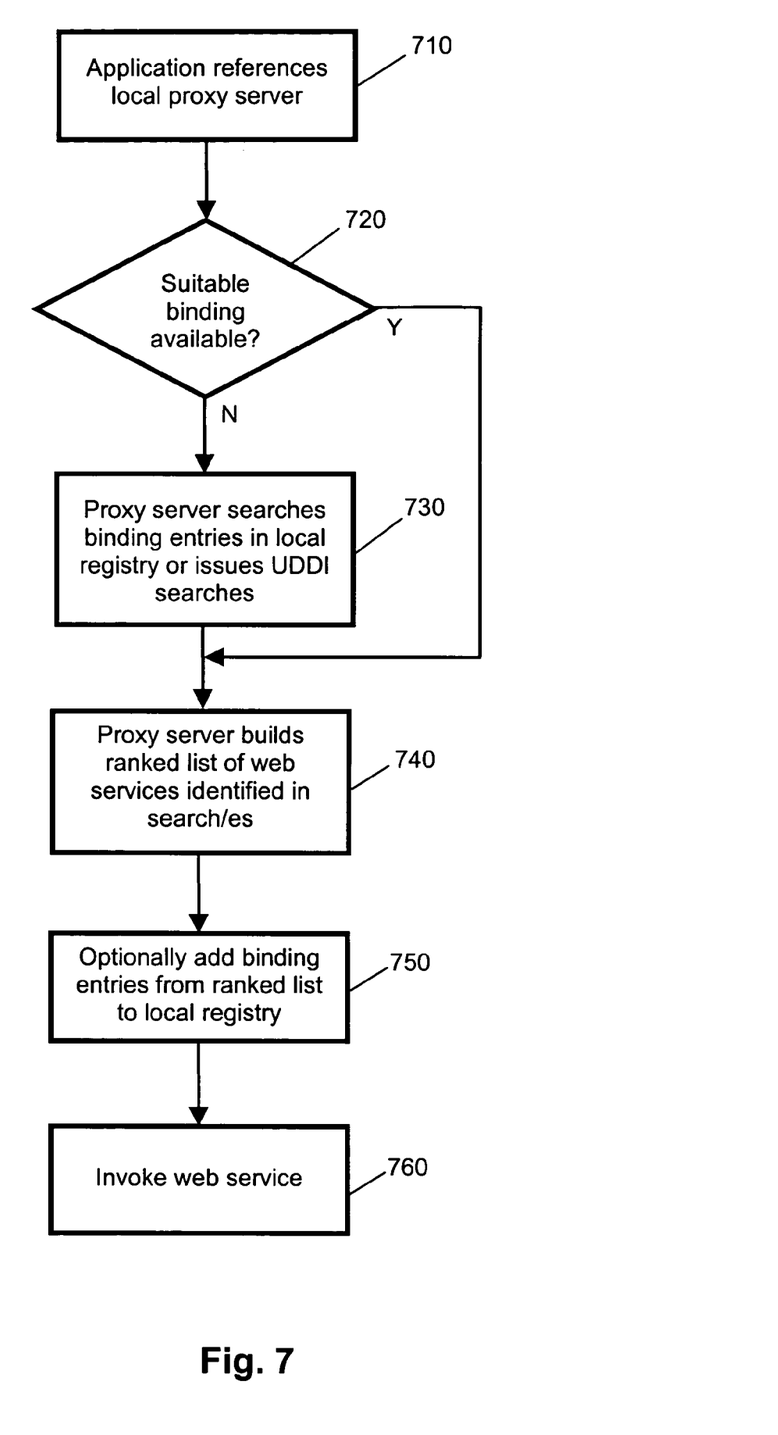
FIG. 7 is a flow diagram of another embodiment of the method of FIG. 6.

FIG. 7 shows another embodiment of the method of FIG. 6. At step 710, a requesting application references a local proxy server on a fixed port prior to invoking a web service. At step 720, the proxy server determines whether a suitable binding for a web service is available from a local repository in response to the application's request. Determination of a suitable binding may be based on any one or more of calculated statistics, user policies stored as part of management of registry data, and invocation results. If a suitable binding is not available (N), the proxy server searches binding entries in a local registry or issues UDDI search/es at step 730. A subset of given inputs (search criteria) may be used to identify a superset of web services. Alternatively, a superset of given inputs may be used to identify specialised web services. The proxy server uses the search results from step 730 to build a ranked list of web services at step 740. Binding entries relating to one or more items on the ranked list may be added to the local repository at step 750, if appropriate. A web service is invoked at step 760. If a suitable binding is available (Y) at step 720, the web service is invoked at step 760.

Bindings may be stored in files, by Lightweight Directory Access Protocol (LDAP) or Java Naming and Directory Interfaces (JNDI), which enable distributed components of an application to locate one another, (as per step 230 of FIG. 2) and are available for access using published Application Programmer Interfaces (API's). A Graphical User Interface (GUI) may be used to manage binding entries and/or rules to manage the lifetime of binding entries.

In alternative embodiments, the local repository may be queried at runtime of an application or while designing a new application.

Figure 8:
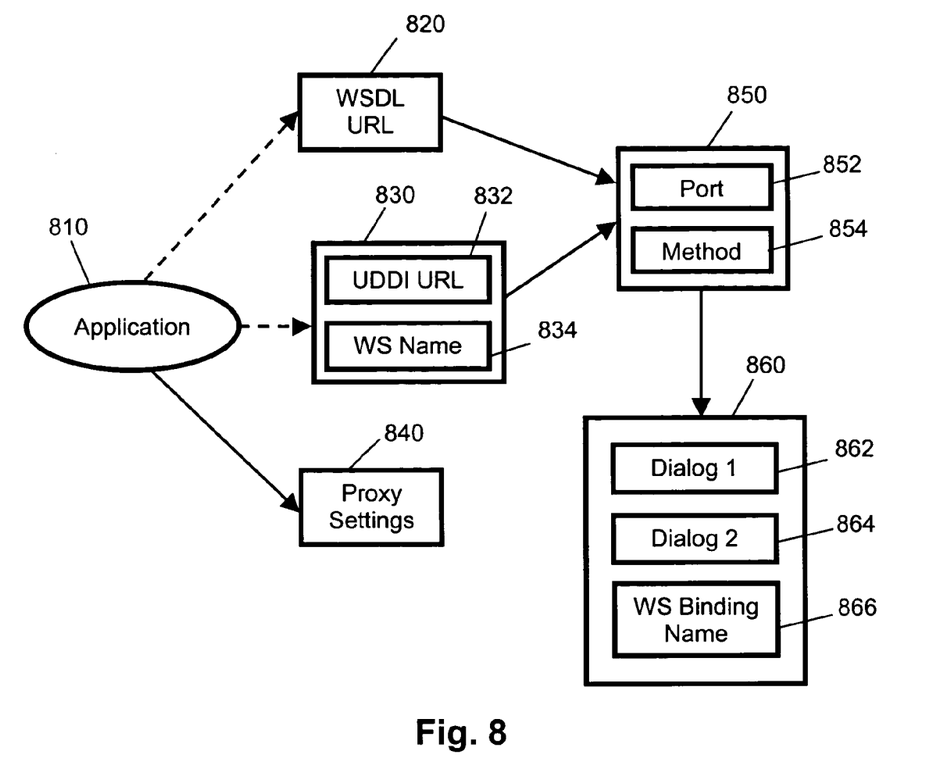
FIG. 8 is a series of screen shots relating to a method for storing information relating to a web service in a local (client-side) registry.

FIG. 8 shows a series of screen shots of a method for storing information relating to a web service in a local (client-side) registry.

If the location of a Web Services Description Language (WSDL) document relating to a required web service is known, discovery, selection, composition, and orchestration are unnecessary. The Web Services Description Language (WSDL) document is accessed by an application 810 by means of a Universal Resource Locator (URL) 820 for the WSDL document or by means of a UDDI directory URL 832 and the name of the required web service 834. Using information contained in the WSDL document 850, the port 852 and method 854 for invocation of the web service are selected, which correspond to the soap:address and binding references in Table 1, hereinafter, respectively. The dialog or page 862 from which the web service invocation will be made and the dialog or page 864 to which the web service's results will be delivered may be specified. Finally, a registry or binding name 866 is allocated to the web service access information, which is stored in a local (client-side) registry for later use. The WS binding name 866 typically comprises an identifier or mnemonic label to enable access of the information stored in the local registry by different applications.

The proxy settings 840 may comprise the URL of the proxy server and the port number to use. Alternatively, the proxy settings 840 may comprise a list of proxy servers to be used in an order of preference or a sophisticated re-direction software utility such as a socks server.

Table 1, hereinafter, contains an example of a WSDL file for a web service representing an online address book. The function of the web service is to return an address for a given person's name. The input and output messages are named "AddressBookRequest" and "AddressBookResponse", respectively, and are both of type string (xsd:string). The <service> construct describes the web service, including the necessary binding (interface and protocols) and the URL address where the web service can be located.

TABLE 1

WDSL file for online address book web service.

```
<?xml version="1.0"?>
<definitions name="urn:AxisAddrBook"
        targetNamespace="urn:AxisAddrBook"
        xmlns:tns="urn:AxisAddrBook"
        xmlns:xsd="http://www.w3.org/2001/XMLSchema"
        xmlns:soap="http://schemas.xmlsoap.org/wsdl/soap/"
        xmlns:slt="http://schemas.xmlsoap.org/ws/2003/03/service-link/"
        xmlns="http://schemas.xmlsoap.org/wsdl/">
    <message name="AddressBookRequest">
            <part name="input" type="xsd:string" />
            </message>
    <message name="AddressBookResponse">
            <part name="output" type="xsd string" />
            </message>
    <portType name="AddrBook-PT">
            <operation name="invoke">
            <input message="tns:AddressBookRequest" />
            <output message="tns:AxisAddressBookResponse" />
            </operation>
            </portType>
    <!-- binding declarations: the opera -->
    <binding name="AddrBookSOAPBinding" type="tns:AddrBook
PT">
            <soap:binding style="rpc"
```

TABLE 1-continued

WDSL file for online address book web service.

```
      transport="http://schemas.xmlsoap.org/soap/http" />
      <operation name="invoke">
        <soap:operation soapAction="" />
        <input>
          <soap:body use="encoded" namespace="urn:
            AxisAddrBook"
            encodingStyle="http://schemas.xmlsoap.org/soap/
            encoding/" />
        </input>
        <output>
          <soap:body use="encoded" namespace="urn:
            AxisAddrBook"
            encodingStyle="http://schemas.xmlsoap.org/soap/
            encoding/" />
        </output>
      </operation> </binding>
  <!-- service declaration -->
  <service name="AddressBookService">
    <port name="AddrBook"
        binding="tns:AddrBookSOAPBinding">
      <soap:address
          location="http://localhost:9801/axis/services/AxisAddr
          Book" />
    </port>
  </service>
</definitions>
```

Figure 9:
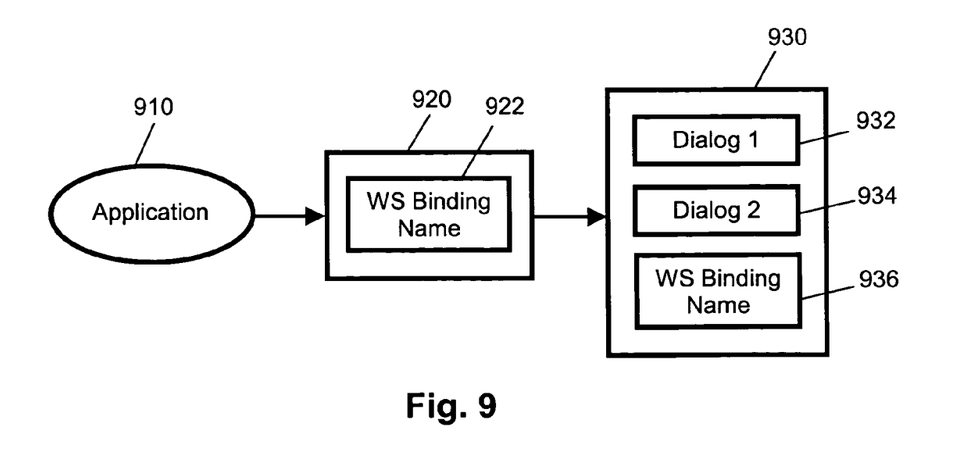
FIG. 9 is a series of screen shots relating to a method for accessing information relating to a web service from a local (client-side) registry.

FIG. 9 shows a series of screen shots of a method for accessing information relating to a web service from a local (client-side) registry.

An application 910 accesses information relating to a specific web service stored in a local (client-side) registry by means of binding name 922 relating to that web service. Such information includes, but is not limited to, the port and method to be used for invocation of the web service. The dialog or page 932 from which the web service invocation will be made and the dialog or page 934 to which the web service's results will be delivered may be specified. The binding name 922 corresponds to a previously stored binding name such as the binding name 866 in FIG. 8. The WS binding names 922 and 936 typically comprise an identifier or mnemonic label to enable access of the information stored in the local registry by different applications. The applications will need to know a related identifier or label to access specific information in the local registry.

Figure 10:
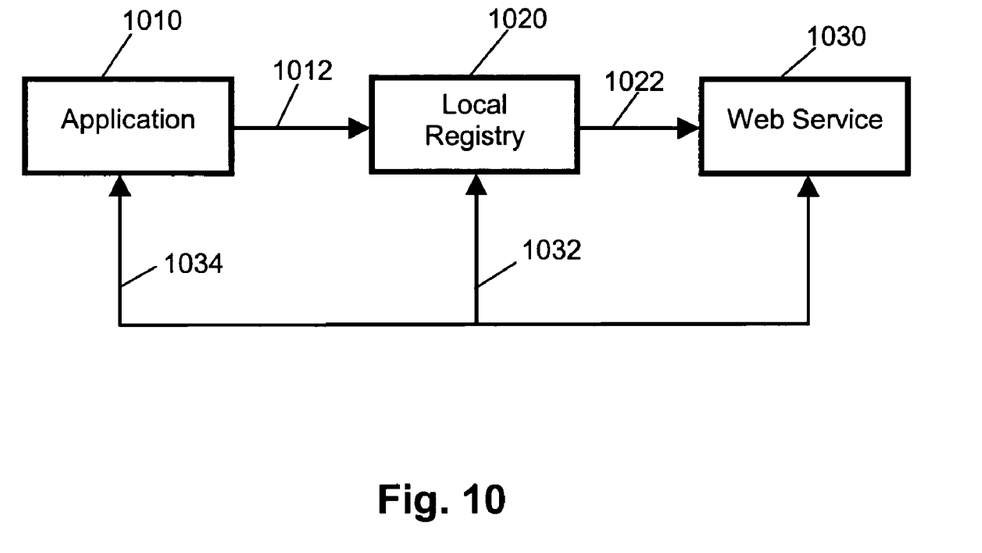
FIG. 10 is a block and flow diagram of a system and method for storage and access of information relating to a web service in/from a local (client-side) registry.

FIG. 10 shows another embodiment for storage and access of information relating to a web service in/from a local (client-side) registry.

An application 1010 submits information 1012 relating to a required functionality such as goals, selection criteria and/or run-time parameters to a local registry 1020. The local registry 1020 invokes 1022 a web service 1030, which returns results 1034 to the application 1010. The local registry 1020 stores web service access information including statistical information 1032 such as runtime Quality of Service (QoS) related information. Consequently, a client application may be able to refer to the local registry for information relating to previous web service invocation by the same application or another application on the same client platform. Advantageously, this may avoid the need for certain configuration steps and/or the reuse of previous results altogether, in the case of static information.

Computer Hardware and Software

Figure 11:
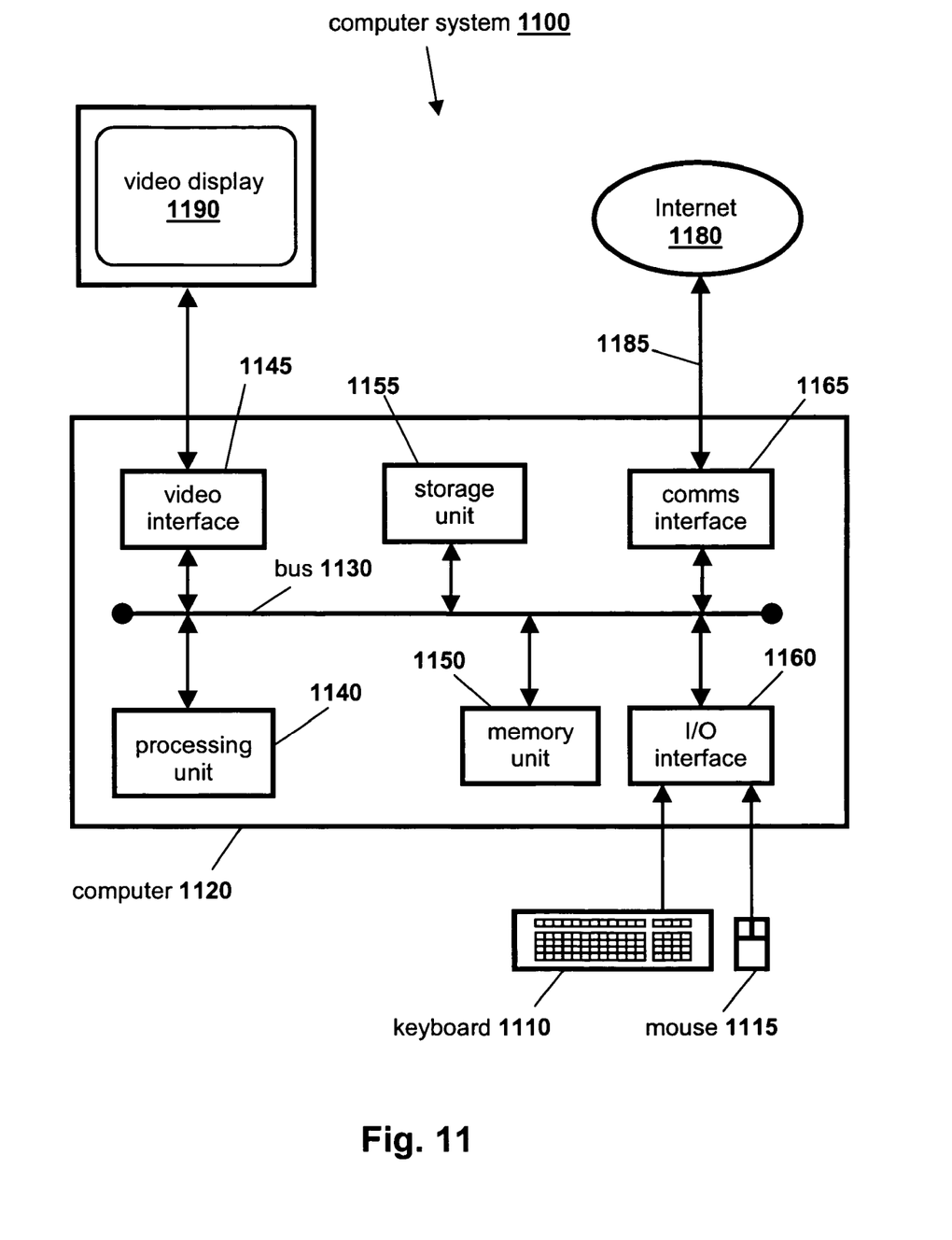
FIG. 11 is a block diagram of a computer system wherewith embodiments of the present invention may be practised.

FIG. 11 is a block diagram representation of a computer system 1100 that can be used to practise the methods described herein. Specifically, the computer system 1100 may be used to practise the client platform and proxy server described hereinbefore. The computer system 1100 is provided for executing computer software that is programmed to assist in performing methods for accessing web services and/or managing information relating to web services. The computer software executes under an operating system such as MS Windows XP™ or Linux™ installed on the computer system 1100.

The computer software involves a set of programmed logic instructions that may be executed by the computer system 1100 for instructing the computer system 1100 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer program may be processed using a compiler into a binary format suitable for execution by the operating system. The computer program is programmed in a manner that involves various software components, or code means, that perform particular steps of the methods described hereinbefore.

The components of the computer system 1100 comprise: a computer 1120, input devices 1110, 1115 and a video display 1190. The computer 1120 comprises a processing unit 1140, a memory unit 1150, an input/output (I/O) interface 1160, a communications interface 1165, a video interface 1145, and a storage unit 1155. The computer 1120 may comprise more than one of any of the foregoing units, interfaces, and devices.

The processing unit 1140 may comprise one or more processors that execute the operating system and the computer software executing under the operating system. The memory unit 1150 may comprise random access memory (RAM), read-only memory (ROM), flash memory and/or any other type of memory known in the art for use under direction of the processing unit 1140.

The video interface 1145 is connected to the video display 1190 and provides video signals for display on the video display 1190. User input to operate the computer 1120 is provided via the input devices 1110 and 1115, comprising a keyboard and a mouse, respectively. The storage unit 1155 may comprise a disk drive or any other suitable non-volatile storage medium.

Each of the components of the computer 1120 is connected to a bus 1130 that comprises data, address, and control buses, to allow the components to communicate with each other via the bus 1130.

The computer system 1100 may be connected to one or more other similar computers via the communications interface 1165 using a communication channel 1185 to a network 1180, represented as the Internet.

The computer software program may be provided as a computer program product, and recorded on a portable storage medium. In this case, the computer software program is accessible by the computer system 1100 from the storage device 1155. Alternatively, the computer software may be accessible directly from the network 1180 by the computer 1120. In either case, a user can interact with the computer system 1100 using the keyboard 1110 and mouse 1115 to operate the programmed computer software executing on the computer 1120.

The computer system 1100 has been described for illustrative purposes. Accordingly, the foregoing description relates to an example of a particular type of computer system suitable for practising the methods and computer program products described hereinbefore. Other configurations or types of computer systems can equally well be used to practise the methods and computer program products described hereinbefore, as would be readily understood by persons skilled in the art. For example, the methods and computer program products described hereinbefore can be practised using a network of computer systems such as a local area network or a handheld computer such as a Personal Digital Assistant (PDA) or a mobile telephone.

Conclusion

Methods, apparatuses and computer program products are described herein that store information relating to web services in a client-side repository. This advantageously enables reuse of web services by the same application or another application hosted by the client platform and thus minimizes searching and/or reference of an external web service directory. The stored information may extend to information relating to alternative web services including alternative workflows, ranking, preferences, policies, etc. Thus, if particular web services become unavailable, alternatives may be identifiable using the client-side repository.

Embodiments described herein may provide one or more of the following advantages:
- enables programmers to identify a number of similar web services without necessarily referring to UDDI.
- simplifies change of web service access information, including web service discovery and selection.
- simplifies maintenance of applications.
- simplifies application design.
- makes dynamic binding deterministic.
- supports individual-centric, group-centric and organization-centric policies for accessing web services.
- supports advance queries on web services, which may be useful for performing statistical queries such as number and type of web services and identifying neglected areas, popular themes, m-commerce competition, etc.
- applicable to both middleware and end-user applications.

The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

We claim:

1. A method for making access information relating to web services locally available to local applications hosted by a client platform, said method comprising:
    storing access information relating to said web services, including binding related information associated with prior web service requests by a first local application, in a local access registry hosted by said client platform, wherein said access information relating to web services further includes discovery related information, including Universal Description, Discovery, and Integration (UDDI) directory information, goal criteria, and resulting subsets of web services, selection related information comprising: selection criteria and selected subsets of web services, composition related information comprising: composed candidate workflows and corresponding rankings, orchestration related information comprising: orchestration selections and corresponding rankings, actual workflows, Quality of Service (QoS) or Service Level Agreement (SLA) requirements, and runtime context and statistical information, binding related information comprising: Web Services Description Language (WSDL) information, binding options and decision criteria, and context and statistical information, invocation related information comprising: proxy and network connectivity, parameter level and statistical and context information, associated with said prior web service requests by local applications;
    subsequently requesting, by a second local application, a web service;
    if binding related information associated with said web service, requested by said second local application, is stored in said local access registry, then invoking, by said local access registry, said web service based on associated binding related information stored in said local access registry; and
    if said binding related information associated with said web service is not stored in said local access registry, then invoking, by said local access registry, said web service using a remote web service directory, based on said requesting by said second local application.

2. The method of claim 1, further comprising associating said requested web service with said discovery related information stored in said local access registry.

3. The method of claim 1, wherein said binding information associated with said requested web service is not stored in said local access registry because said binding information associated with said requested web service is stale.

4. The method of claim 1, wherein said local access registry also stores invocation related information including proxy/network connectivity, parameter level, and statistical/context information related to invocation and web service instances.

5. A method for making access information relating to suitable web services locally available to local applications hosted on a client platform, said method comprising:
    storing access information relating to said suitable web services, including binding related information and composition related information, including corresponding rankings, associated with prior web service requests by a first local application, into a local access registry hosted by said client platform, wherein said access information relating to web services further includes discovery related information, including Universal Description, Discovery, and Integration (UDDI) directory information, goal criteria, and resulting subsets of web services, selection related information comprising: selection criteria and selected subsets of web services, orchestration related information comprising: orchestration selections and corresponding rankings, actual workflows, Quality of Service (QoS) or Service Level Agreement (SLA) requirements, and runtime context and statistical information, binding related information comprising: Web Services Description Language (WSDL) information, binding options and decision criteria, and context and statistical information, invocation related information comprising: proxy and network connectivity, parameter level and statistical and context information, associated with said prior web service requests by local applications;
    subsequently requesting, by a second local application, a suitable web service via a local proxy server;
    searching, by said local proxy server, said local access registry for binding related information associated with said suitable web service;
    if binding related information associated with said suitable web service, requested by said second local application, is stored in said local access registry, then invoking, by said local access registry, said suitable web service based on said binding related information and said composition related information, including corresponding rankings, stored in said local access registry;

if said binding related information associated with said web service is not stored in said local access registry, then invoking, by said local access registry, said suitable web service using a remote web service directory based on said requesting by said second local application;

ranking, by said proxy server, said suitable web service, based on said corresponding rankings of said composition related information for a set of suitable web services; and adding said suitable web service to a ranked list of suitable web services, based on said corresponding rankings.

6. An apparatus for making access information relating to web services locally available to local applications hosted by a client platform, said apparatus comprising:

at least one communications interface that transmits and receives said access information relating to said web services between said client platform and a remote web service directory, wherein said access information relating to web services further includes discovery related information, including Universal Description, Discovery, and Integration (UDDI) directory information, goal criteria, and resulting subsets of web services, selection related information comprising: selection criteria and selected subsets of web services, composition related information comprising: composed candidate workflows and corresponding rankings, orchestration related information comprising: orchestration selections and corresponding rankings, actual workflows, Quality of Service (QoS) or Service Level Agreement (SLA) requirements, and runtime context and statistical information, binding related information comprising: Web Services Description Language (WSDL) information, binding options and decision criteria, and context and statistical information, invocation related information comprising: proxy and network connectivity, parameter level and statistical and context information, associated with said prior web service requests by local applications;

a memory unit that stores said access information;

a processing unit coupled to said at least one communications interface and said memory unit, said processing unit:

storing access information relating to said web services, including binding related information associated with prior web service requests by a first local application, in a local access registry hosted by said client platform;

subsequently requesting, by a second local application, a web service;

if binding related information associated with said web service, requested by said second local application, is stored in said local access registry, then invoking, by said local access registry, said web service based on said binding related information stored in said local access registry; and if said binding related information associated with said web service is not stored in said local access registry, then invoking, by said local access registry, said web service using a remote web service directory based on said requesting by said second local application.

7. The apparatus of claim 6, wherein said processing unit further associates said web service with said discovery related information stored in said local access registry.

8. The apparatus of claim 6, wherein if said binding information associated with said web service is not stored in said local access registry, then said binding information associated with said web service is stale.

9. The apparatus of claim 6, comprising said processing unit, wherein said local access registry also stores invocation related information including proxy/network connectivity, parameter level, and statistical/context statistical information related to invocation and web service instances.

10. An apparatus for making access information relating to suitable web services locally available to local applications hosted on a client platform, said apparatus comprising:

at least one communications interface that transmits and receives said access information relating to said suitable web services between said client platform and a remote web service directory;

a memory unit that stores said access information;

a processing unit coupled to said at least one communications interface and said memory unit, said processing unit:

storing access information relating to said suitable web services, including binding related information and composition related information, including corresponding rankings, associated with prior web service requests by a first local application, into a local access registry hosted by said client platform, wherein said access information relating to web services further includes discovery related information, including Universal Description, Discovery, and Integration (UDDI) directory information, goal criteria, and resulting subsets of web services, selection related information comprising: selection criteria and selected subsets of web services, orchestration related information comprising: orchestration selections and corresponding rankings, actual workflows, Quality of Service (QoS) or Service Level Agreement (SLA) requirements, and runtime context and statistical information, binding related information comprising: Web Services Description Language (WSDL) information, binding options and decision criteria, and context and statistical information, invocation related information comprising: proxy and network connectivity, parameter level and statistical and context information, associated with said prior web service requests by local applications;

subsequently requesting, by a second local application, a suitable web service via a local proxy server;

searching, by said local proxy server, said local access registry for binding related information associated with said suitable web service;

if binding related information associated with said suitable web service, requested by said second local application, is stored in said local access registry, then invoking, by said local access registry, said suitable web service based on said binding related information and said composition related information, including corresponding rankings, stored in said local access registry;

if said binding related information associated with said web service is not stored in said local access registry, then invoking, by said local access registry, said suitable web service using a remote web service directory based on said requesting by said second local application;

ranking, by said proxy server, said suitable web service, based on said corresponding rankings of said composition related information for a set of suitable web services; and adding said suitable web service to a ranked list of suitable web services, based on said corresponding rankings.

11. A method for making access information relating to web services locally available to local applications hosted by a client platform, said method comprising:

storing access information relating to web services, including the locations of Web Services Description Language (WSDL) documents associated with prior web service requests by a first local application, in a local access registry hosted by said client platform, wherein said access information relating to web services further includes discovery related information, including Universal Description, Discovery, and Integration (UDDI) directory information, goal criteria, and resulting subsets of web services, selection related information comprising: selection criteria and selected subsets of web services, composition related information comprising: composed candidate workflows and corresponding rankings, orchestration related information comprising: orchestration selections and corresponding rankings, actual workflows, Quality of Service (QoS) or Service Level Agreement (SLA) requirements, and runtime context and statistical information, binding related information comprising: Web Services Description Language (WSDL) information, binding options and decision criteria, and context and statistical information, invocation related information comprising: proxy and network connectivity, parameter level and statistical and context information, associated with said prior web service requests by local applications;

subsequently requesting, by a second local application, a web service;

if a location of a WSDL document associated with said web service requested, by said second local application, is stored in said local access registry, then invoking, by said local access registry, said web service based on said location of said WSDL document stored in said local access registry; and if said location of said WSDL document associated with said web service is not stored in said local access registry, then invoking, by said local access registry, said web service using a remote web service directory, based on said location of said WSDL document requested by said second local application.

12. An apparatus for making access information relating to web services locally available to local applications hosted by a client platform, said apparatus comprising:

at least one communications interface that transmits and receives said access information relating to said web services between said client platform and locations of Web Services Description Language (WSDL) documents;

a memory unit that stores said access information;

a processing unit coupled to said at least one communications interface and said memory unit, said processing unit:

storing access information relating to web services, including the locations of WSDL documents associated with prior web service requests by a first local application, in a local access registry hosted by said client platform, wherein said access information relating to web services further includes discovery related information, including Universal Description, Discovery, and Integration (UDDI) directory information, goal criteria, and resulting subsets of web services, selection related information comprising: selection criteria and selected subsets of web services, composition related information comprising: composed candidate workflows and corresponding rankings, orchestration related information comprising: orchestration selections and corresponding rankings, actual workflows, Quality of Service (QoS) or Service Level Agreement (SLA) requirements, and runtime context and statistical information, binding related information comprising: Web Services Description Language (WSDL) information, binding options and decision criteria, and context and statistical information, invocation related information comprising: proxy and network connectivity, parameter level and statistical and context information, associated with said prior web service requests by local applications;

subsequently requesting, by a second local application, a web service;

if a location of a WSDL document associated with said web service requested by said second local application is stored in said local access registry, then invoking, by said local access registry, said web service based on said location of said WSDL document stored in said local access registry; and if said location of said WSDL document associated with said web service is not stored in said local access registry, then invoking, by said local access registry, said web service using a remote web service directory, based on said requesting by said second local application.

* * * * *